(12) United States Patent
Jeon et al.

(10) Patent No.: US 11,822,967 B2
(45) Date of Patent: Nov. 21, 2023

(54) TASK DISTRIBUTION METHOD FOR MINIMIZING PREEMPTION BETWEEN TASKS AND APPARATUS FOR PERFORMING THE SAME

(71) Applicant: Research & Business Foundation Sungkyunkwan University, Suwon-si (KR)

(72) Inventors: Jaewook Jeon, Suwon-si (KR); Junyoung Moon, Suwon-si (KR); Doyeon Kim, Suwon-si (KR); Minhee Jo, Suwon-si (KR); Jaewan Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 476 days.

(21) Appl. No.: 16/998,372

(22) Filed: Aug. 20, 2020

(65) Prior Publication Data
US 2021/0055969 A1  Feb. 25, 2021

(30) Foreign Application Priority Data

Aug. 20, 2019  (KR) .................. 10-2019-0101913
Aug. 20, 2019  (KR) .................. 10-2019-0101914

(51) Int. Cl.
*G06F 9/50* (2006.01)
*G06F 9/48* (2006.01)

(52) U.S. Cl.
CPC .......... *G06F 9/5038* (2013.01); *G06F 9/4887* (2013.01); *G06F 9/505* (2013.01)

(58) Field of Classification Search
None
See application file for complete search history.

(56) References Cited

U.S. PATENT DOCUMENTS

2011/0083121 A1* 4/2011 Dixit .................. G06F 11/3684
                                                         717/124
2013/0055276 A1  2/2013 Park et al.
(Continued)

FOREIGN PATENT DOCUMENTS

JP        9-282184 A    10/1997
JP     2002-342097 A    11/2002
(Continued)

OTHER PUBLICATIONS

Korean Office Action dated Sep. 28, 2021 in counterpart Korean Patent Application No. 10-2020-0104127 (5 pages in Korean).

(Continued)

*Primary Examiner* — Eric C Wai
(74) *Attorney, Agent, or Firm* — NSIP Law (57) ABSTRACT

Provided is a method for arranging tasks including sequentially allocating offsets, in unit of load measurement, to tasks having a period equal to or greater than a reference value, among the tasks, and sequentially allocating the offsets to tasks having a period smaller than the reference value, among the tasks, in ascending order, starting from a task having a shortest period, the sequentially allocating the offset comprising sequentially allocating a smallest offset to a first task having a shortest period among tasks having the period smaller than the reference value and allocating the offset to a second task, which is an allocation target of the offset, among remaining tasks excluding the first task, among the tasks having the period smaller than the reference value, based on a result of comparing the period of the first task and an execution time of the second task.

16 Claims, 6 Drawing Sheets

(56) References Cited

U.S. PATENT DOCUMENTS

| | | | | |
|---|---|---|---|---|
| 2014/0053161 A1* | 2/2014 | Sadowski | ............. | G06F 9/4887 718/102 |
| 2014/0089889 A1* | 3/2014 | Maclay | .................... | G06F 8/70 717/104 |
| 2020/0104170 A1* | 4/2020 | Else | .................... | G06F 9/4887 |

FOREIGN PATENT DOCUMENTS

| | | |
|---|---|---|
| KR | 2002-0022049 A | 3/2002 |
| KR | 10-2010-0060312 A | 6/2010 |
| KR | 10-2014-0113310 A | 9/2014 |
| KR | 10-2015-0053672 A | 5/2015 |

OTHER PUBLICATIONS

Andersson, Björn et al., "Multiprocessor Scheduling with Few Preemptions," *12th IEEE International Conference on Embedded and Real-Time Computing Systems and Applications (RTCSA'06). IEEE*, Aug. 2006 (pp. 1-22).

Kato, Shinpei et al., "Real-Time Scheduling with Task Splitting on Multiprocessors," *13th IEEE International Conference on Embedded and Real-Time Computing Systems and Applications (RTCSA 2007). IEEE*, 2007 (pp. 1-10).

Korean Notice of Allowance dated Feb. 8, 2021 in counterpart Korean Patent Application No. 10-2019-0101913 (3 pages in Korean).

Korean Notice of Allowance dated Mar. 23, 2022, in counterpart Korean Patent Application No. 10-2020-0104127 (5 pages in Korean).

* cited by examiner

TASK DISTRIBUTION METHOD FOR MINIMIZING PREEMPTION BETWEEN TASKS AND APPARATUS FOR PERFORMING THE SAME

This application claims the priority benefit of Korean Patent Application No. 10-2019-0101913 filed on Aug. 20, 2019, and 10-2019-0101914 filed on Aug. 20, 2019, which are incorporated herein by reference for all purposes as if fully set forth herein.

BACKGROUND OF THE INVENTION

Field of the Invention

The present disclosure relates to a task distribution method for minimizing preemption between tasks and an apparatus for performing the same to improve task arrangement performance.

Related Art

A necessity for a technology of efficiently distributing and allocating tasks has emerged in line with an increase in the number of tasks performed by an electronic control unit (ECU) due to an increase in functions of a vehicle. As a result, an introduction of multi-core ECUs to process a large number of tasks with limited ECU resources and environment is under discussion.

In particular, in case of a vehicle ECU, it is necessary to distribute tasks having different processing periods, execution times, and priorities so as to be most optimized. In this situation, a task having a long execution time may be preempted by a task having a high priority and such preemption causes context switching to cause overhead, which increases a load of a central processing unit (CPU). This results in inefficient use of the ECU.

In case of task scheduling based on a priority relationship in an existing multi-core system, a deadline for each task is corrected based on a mutual execution order relationship of tasks, an actual execution order of the tasks is determined based on the corrected deadlines, and the tasks are partitioned and arranged based on the determined execution order in a multi-core environment. This task scheduling may be considered as an optimized algorithm in terms of arrangement in a task unit in the multi-core environment but may not be admitted as a detailed algorithm reflecting a sub-task unit, i.e., a runnable unit. As a result, in case of a task having a long execution time, preemption by another task may inevitably occur, resulting in occurrence of context switching overhead to cause inefficient use of the ECU.

In addition, the increase in the number of tasks causes preemption between tasks according to priority, which causes context switching to cause more time overhead compared with a case where no preemption occurs between tasks. Therefore, a method of arranging tasks at regular time offsets to avoid a situation in which tasks are preempted is required.

SUMMARY OF THE INVENTION

In an aspect, a method for arranging tasks is provided. The method includes: sequentially allocating offsets, in unit of load measurement, to tasks having a period equal to or greater than a reference value, among the tasks; and sequentially allocating the offsets to tasks having a period smaller than the reference value, among the tasks, in ascending order, starting from a task having a shortest period, the sequentially allocating the offset comprising sequentially allocating a smallest offset to a first task having a shortest period among tasks having the period smaller than the reference value and allocating the offset to a second task, which is an allocation target of the offset, among remaining tasks excluding the first task, among the tasks having the period smaller than the reference value, based on a result of comparing the period of the first task and an execution time of the second task.

In another aspect, a method for arranging tasks is provided. The method includes: sequentially virtually arranging tasks, starting from a task having a short period at a minimum offset; if preemption to another task occurs during virtual arrangement of a specific task, storing a preemption number as a first preemption number and searching a preemption non-occurrence section by virtually arranging the specific task at a non-arrangement section in which a task is not arranged in ascending order; if the preemption non-occurrence section is searched as a result of searching, arranging the specific task at the preemption non-occurrence section without partitioning the specific task; if the preemption non-occurrence section is not searched as a result of searching, storing, as a second preemption number, a minimum preemption number obtained as a result of virtually arranging the specific task at the non-occurrence section in offset ascending order without partitioning the specific task and storing, as a third preemption number, a minimum preemption number obtained as a result of virtually arranging the task in a smaller unit of a runnable unit; and comparing the third preemption number with the first and second preemption numbers and arranging the specific task based on a comparison result

DESCRIPTION OF EXEMPLARY EMBODIMENTS

Since the present disclosure may be modified in various forms, and may have various embodiments, the following exemplary embodiments are illustrated in the accompanying drawings, and are described in detail with reference to the drawings. However, this is not intended to limit the present disclosure to specific embodiments, and the present disclosure should be construed to encompass various changes, equivalents, and substitutions within the technical scope and spirit of the disclosure.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms comprises, "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

In addition, it will be apparent that in the specification, components are just classified for each main function which each component takes charge of. That is, two or more components to be described below may be provided to be combined into one component or one component may be provided to be separated into two or more for each of more subdivided functions. In addition, each of the components to be described below may additionally perform some or all functions among functions which other components take charge of in addition to the main function which each component takes charge of and some functions among the main functions which the respective take charge of may be exclusively charged and performed by other components.

In performing a method or an operation method, each of steps of the method may be performed in order different from order described in the context unless specific order is clearly described in the context. That is, the steps may be performed according to described order, may be performed substantially at the same time, or may be performed in reverse order.

This disclosure describes an electric control unit (ECU) that performs an efficient task arrangement method that minimizes preemption. The ECU may include at least one hardware component (e.g., a processor and/or memory) to perform the task arrangement method described herein and perform various embodiments using each component. Accordingly, it may be understood that various operations/steps described based on the ECU in this disclosure are performed using the at least one component even if the various operations/steps are not repeatedly described.

In addition, an original equipment manufacturer (OEM) measures a load at a period/in unit of a task having the highest load, among tasks, and determines a peak load value per period of the task having the highest load, and therefore, a load result value measured at the period/in unit of the task having the highest load, among the tasks, has a significant meaning. Thus, in order to lower a load rate per period of the task having the highest load, among the tasks, an offset needs to be adjusted such that the task having the highest load, among the tasks, is operated at a fixed position and other tasks need to be arranged at an offset in which a preemption number is minimized. Hereinafter, a more efficient task arrangement method is proposed in consideration of such an offset setting criteria.

Figure 1:
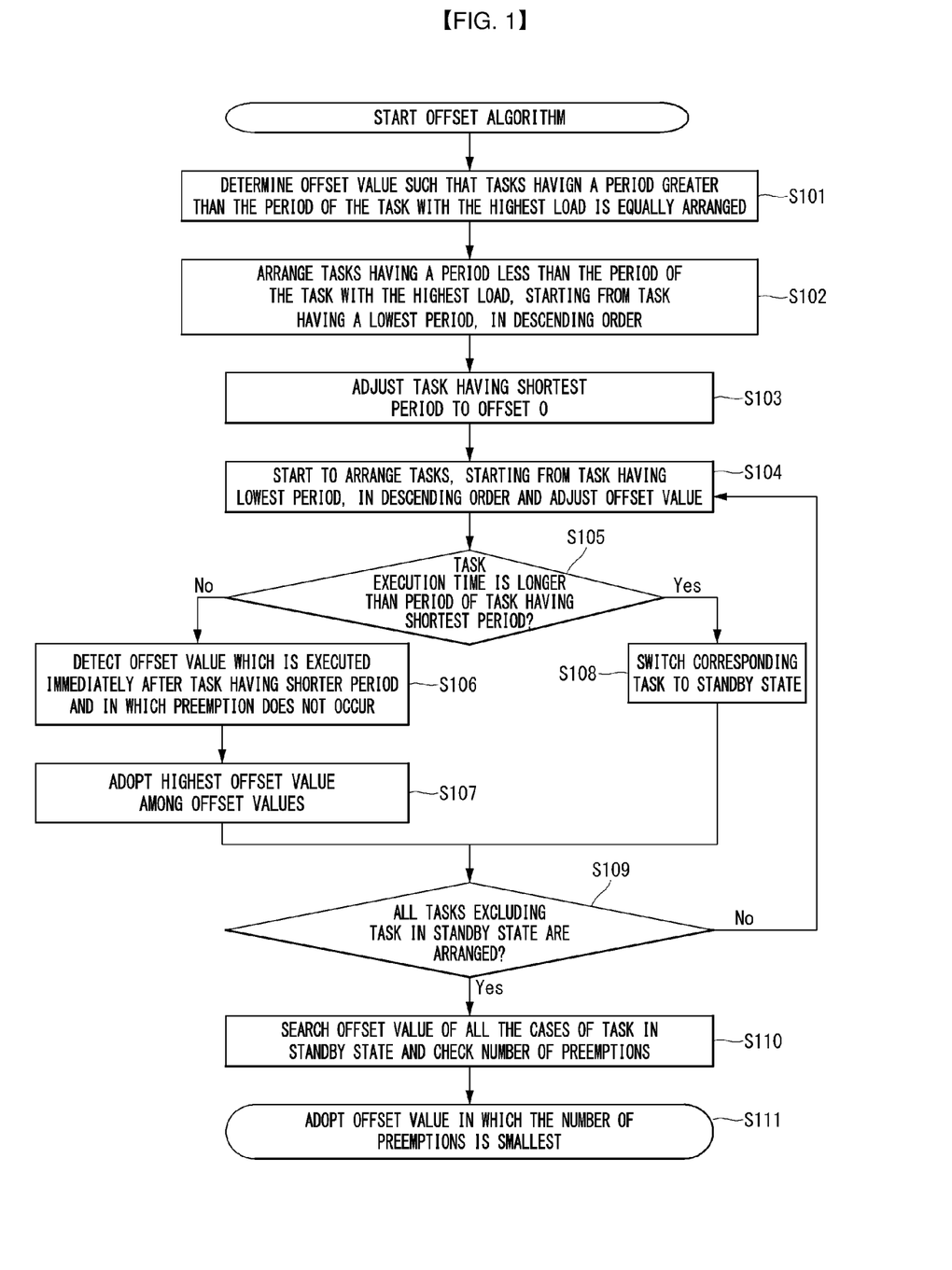
FIG. 1 is a flowchart illustrating a task arrangement method of an electric control unit (ECU) according to an embodiment of the present disclosure.
Figure 2:
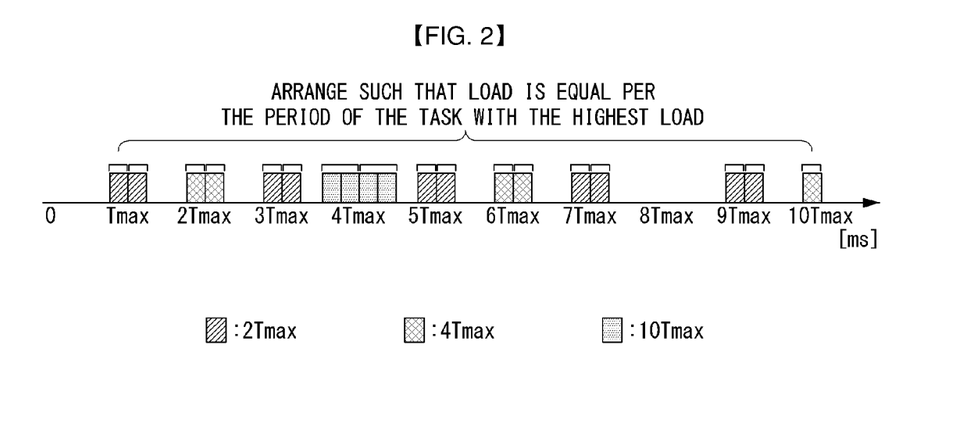
FIGS. 2 and 3 are views illustrating an example of task arrangement according to the task arrangement method of FIG. 1.
Figure 3:
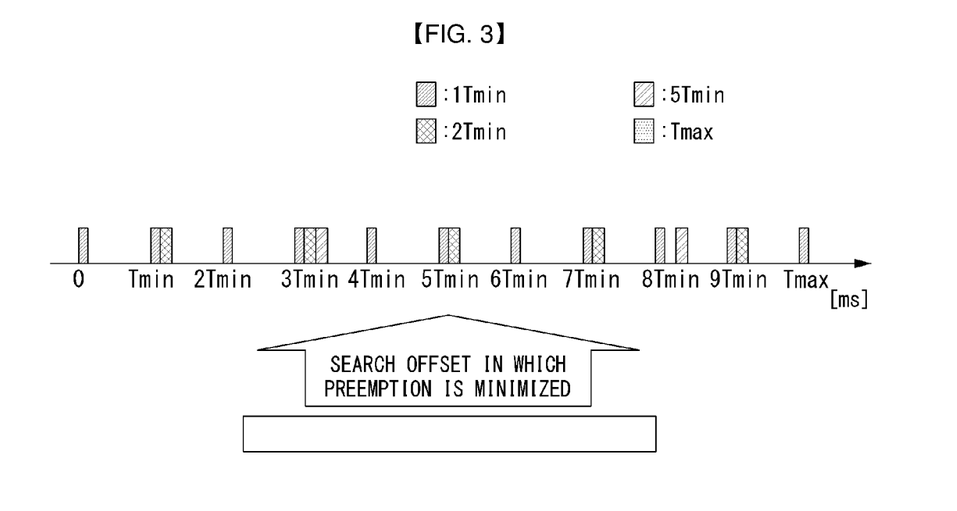

FIG. 1 is a flowchart illustrating a task arrangement method of an ECU according to an embodiment of the present disclosure, and FIGS. 2 and 3 are views illustrating an example of task arrangement according to the task arrangement method of FIG. 1.

In the flowchart of FIG. 1, at least one step may be deleted, a new step may be added, and the order between steps may be changed. Hereinafter, a task arrangement algorithm will be described in detail with reference to FIGS. 2 and 3 based on FIG. 1.

First, the ECU may uniformly arrange a task having the highest load, among tasks, such that loads are measured to be similar at the period/in unit of the task having the highest load (S101). In other words, for the task having the highest load, among the tasks, an offset may be set so that a load value is measured to be equal at the period of "Tmax".

For example, an offset value may be set such that an offset in unit of "Tmax" is arranged at the center of the task having the period of "Tmax" (or at the center of a task execution time) so that a result of measurement of a load evenly in unit/period of "Tmax" is obtained. That is, an offset in unit of "Tmax" is set/arranged at the center of the task, whereby the task (specifically, an execution time of the task) may be equally divided in half based on the offset. Referring to FIG. 2, when the Tmax offset is allocated to a task of "2×Tmax" period, the 2×Tmax periodic task may be arranged such that the Tmax offset is located at the center.

Here, while avoiding preemption with other tasks, offsets are sequentially allocated from a task having a small period and may be allocated in ascending order from a small offset. For example, in case where tasks having periods of 2×Tmax/4×Tmax/10×Tmax are arranged as shown in FIG. 2, the offsets may be allocated to the tasks in ascending order of 2×Tmax→4×Tmax→10×Tmax. Therefore, the Tmax offset may be allocated to a 2×Tmax periodic task, and the Tmax offset may be allocated to a 4×Tmax periodic task. In the case of the 10×Tmax periodic task, if a 3×Tmax offset is allocated, a preemption problem with the 2×Tmax periodic task occurs, and thus, a 4×Tmax offset, which is a minimum offset value among the offsets that do not cause the preemption problem, may be allocated.

Next, the ECU may arrange tasks having a period of Tmax or less in ascending order and sequentially designate an offset, starting from a task having a shortest period (S102). Here, the ECU may adjust the offset of the task having the shortest period to 0 (S103).

Next, the ECU may start to adjust the offset value in ascending order, starting from a task having a low period (S104), and the offset value adjustment method may performed as follows:

First, the ECU may determine whether or not an execution time of an offset designation target task is longer than a period of a task having a shortest period (i.e., the offset is designated as 0 in step S103) (S105).

If it is determined that the execution time of the target task is longer than the period of the task with the shortest period, the ECU may switch the target task to a standby state (S108).

Conversely, when it is determined that the execution time of the target task is shorter than the period of the task having the shortest period, the ECU may detect/search an offset in which the target task is executed immediately after a task (e.g., a task completed in offset designation in order before the target task) having a period shorter than the period of the target task and in which preemption does not occur (S106). Thereafter, the ECU may adopt the highest offset among the detected/searched values (S107).

Steps S102 to S108 will be described below with reference to the example of FIG. 3.

Referring to FIG. 3, since the periodic task having the shortest period Tmin is a task having the highest priority in arrangement, the task may be arranged with an offset 0 allocated thereto. An offset may be designated/adjusted so that the 2×Tmin periodic task having a second shortest period may be executed immediately after the Tmin task is executed. Here, in order to reduce the number of preemptions for equally arranged tasks having the period greater than Tmax, the highest offset (Tmin) among candidate offsets (0 ms, ×Tmin) in which the Tmin periodic task is located may be allocated to the 2×Tmin periodic task. In this case, the 2×Tmin periodic task may be arranged to be executed immediately after the Tmin periodic task arranged at the allocated offset "Tmin". Similarly, the 5×Tmin periodic task may be allocated the highest offset (3×Tmin) among candidate offsets (Tmin, 3×Tmin) which may be arranged immediately after the task ("2×Tmin periodic task) having a period shorter than the period of the 5×Tmin periodic task in consideration of the number of preemptions for the task having the period greater than Tmax. The Tmax periodic task, in which preemption inevitably occurs because of a long task execution time (which, in particular, is longer in execution time than the period of the Tmin periodic task which is a task having the shortest period), may be switched to a standby state and then arranged at an offset in which the smallest number of preemptions occurs. This will be described later.

Referring back to FIG. 1, next, the ECU may determine whether arrangement (i.e., offset designation/allocation/adjustment) for all tasks other than the task switched to the standby state is completed (S109). If the arrangement is not completed, the ECU may return to step S104 again and continue to arrange the other remaining tasks. When the arrangement is completed, the ECU may arrange/allocate all offsets for each of the tasks in the standby state and check the number of preemptions for each of the arranged/allocated offsets (i.e., searching for an offset having a minimum number of preemptions) (S110).

Finally, offsets may be selected/allocated for each of the tasks in the standby state such that the number of preemptions is minimized according to a search result to complete even scheduling of all the tasks in the standby state.

When referring to the present disclosure described above, in the related art, the offset from the result in which the lowest load occurs among the results obtained by virtually arranging all the offsets for each task. In this case, a problem arises in that a simulation time and overhead are large because a simulation should be executed by the number of all the cases. In contrast, in the present disclosure, since an offset of a specific task is fixed to a specific offset in advance, and an offset derivation simulation is performed only for the remaining tasks, a simulation time and overhead are minimized.

Figure 4:
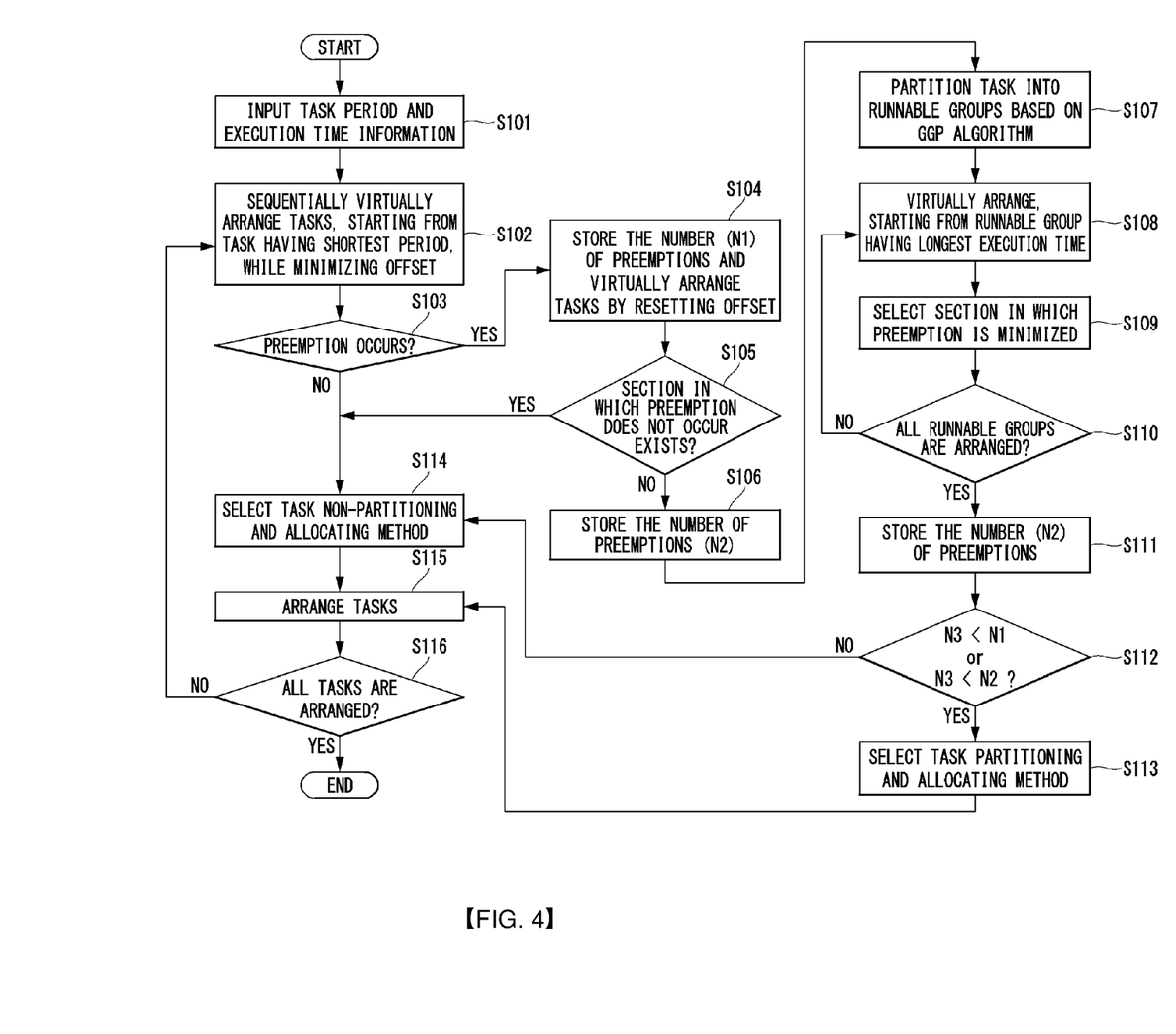
FIG. 4 is a flowchart illustrating a task arrangement algorithm according to another embodiment of the present disclosure.

FIG. 4 is a flowchart illustrating a task arrangement algorithm according to another embodiment of the present disclosure, and FIGS. 5 to 8 are views showing an embodiment of a task arrangement algorithm according to the task arrangement algorithm of FIG. 4.

In the flowchart of FIG. 4, at least one step may be deleted, a new step may be added, and the order between steps may be changed. Hereinafter, the task arrangement algorithm will be described in detail later with reference to FIGS. 5 to 8 based on FIG. 4.

Referring to FIG. 4, first, the ECU may input information regarding each task period and execution time (S101).

Next, the ECU may virtually arrange tasks, starting from a task having the shortest period, while sequentially minimizing offsets (S102). Specifically, the ECU may virtually arrange the tasks based on the assumption that a task having a shorter period has a higher priority (Rate-monotonic method). Accordingly, the ECU virtually arranges the tasks, starting from the task having the shortest period (i.e., in order of priority) and starting from the smallest offset (e.g. ms unit).

The ECU may determine whether preemption occurs while performing the virtual arrangement (S103).

If no preemption occurs while the tasks are sequentially arranged, the ECU may continue to arrange the tasks (S115) by selecting a non-partitioning allocation method that does not partition the tasks into smaller units, runnable units (S114). Here, the ECU arranges the tasks by minimizing the offset in order to secure as much space as possible for other tasks to be subsequently arranged. When the arrangement of all the tasks is completed, the ECU may terminate the task arrangement procedure (S116).

Figure 5:
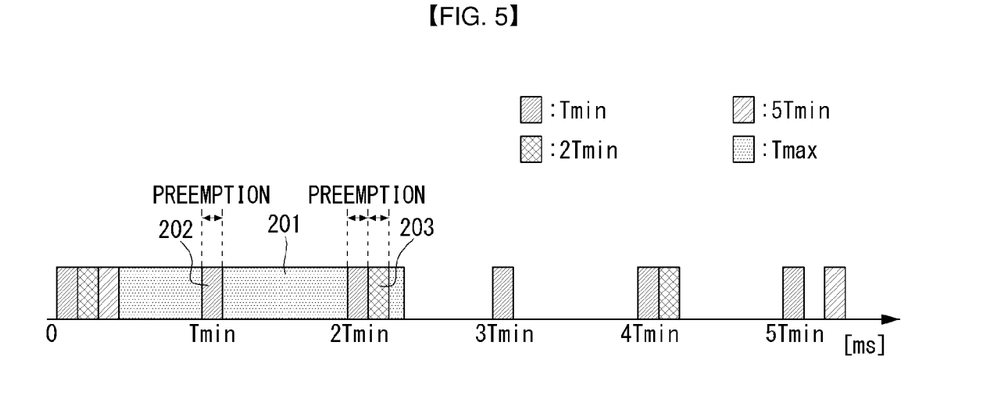
FIGS. 5 to 10 are views showing an example of a task arrangement algorithm according to the task arrangement algorithm of FIG. 4.
Figure 6:
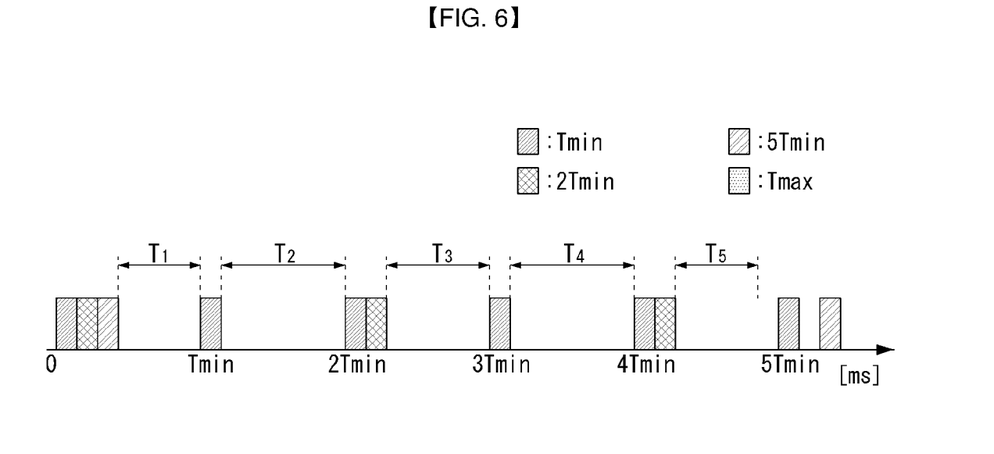

Conversely, if preemption occurs while a specific task is arranged, the ECU may store the number of preemptions for the corresponding task (in the memory) (S104). For example, as illustrated in FIG. 5, in case of virtually arranging a 0 ms offset of the Tmax periodic task 201, if preemption occurs by two Tmin periodic tasks 202 and one 2×Tmin periodic task 203, the ECU may store N1=3. Furthermore, the ECU may store/input information (T1 to T5) of all sections in which a task is not arranged as shown in FIG. 5 and virtually arrange the corresponding task in all sections based on the stored/inputted section information (S104). That is, the ECU may perform virtual arrangement by resetting the offset (e.g., by increasing the offset in which the task is arranged by a predetermined length).

Thereafter, the ECU may determine whether or not preemption occurs on a task as a result of the virtual arrangement (S105) and determine whether to partition and allocate the task in a runnable unit, which is a smaller unit, based on the determination result (S106 to S116) or whether to allocate the task without partitioning (S114 to S116).

Figure 7:
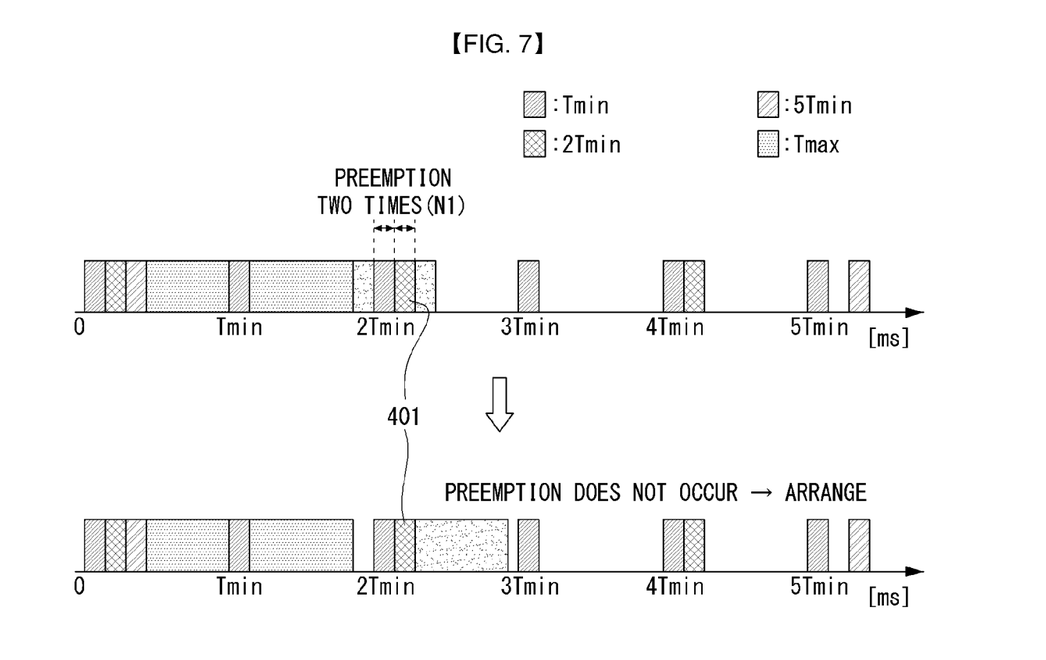

For example, as illustrated in FIG. 7, when a specific task 401 is arranged at a minimum offset of Tmin by avoiding preemption of another task, two preemptions may occur by a Tmin periodic task and a 2×Tmin task for the corresponding specific task 401. Here, the ECU may store the number of preemptions (N1=2) and may store information on a section in which other tasks are not arranged. In addition, the ECU may determine whether there is a non-preempted section by performing a virtual arrangement of the corresponding specific task 401 on the stored non-arrangement sections. When it is discovered that preemption has not occurred as a result of the virtual arrangement, the ECU may determine/complete the arrangement by selecting the shortest period among the sections in which the corresponding specific task 401 may be arranged as non-preemption. This is to secure sufficient extra space of a task to be subsequently arranged. In this drawing, when the corresponding specific task is arranged in the unallocated section of the 2×Tmin offset, preemption by other tasks does not occur, so the ECU may determine/complete the arrangement of the corresponding specific task 401 for the unallocated section.

In this case, since preemption is eliminated, the ECU may perform next arrangement operation of a next task (that is, a task of next priority) immediately after the corresponding specific task is arranged (S115).

Figure 8:
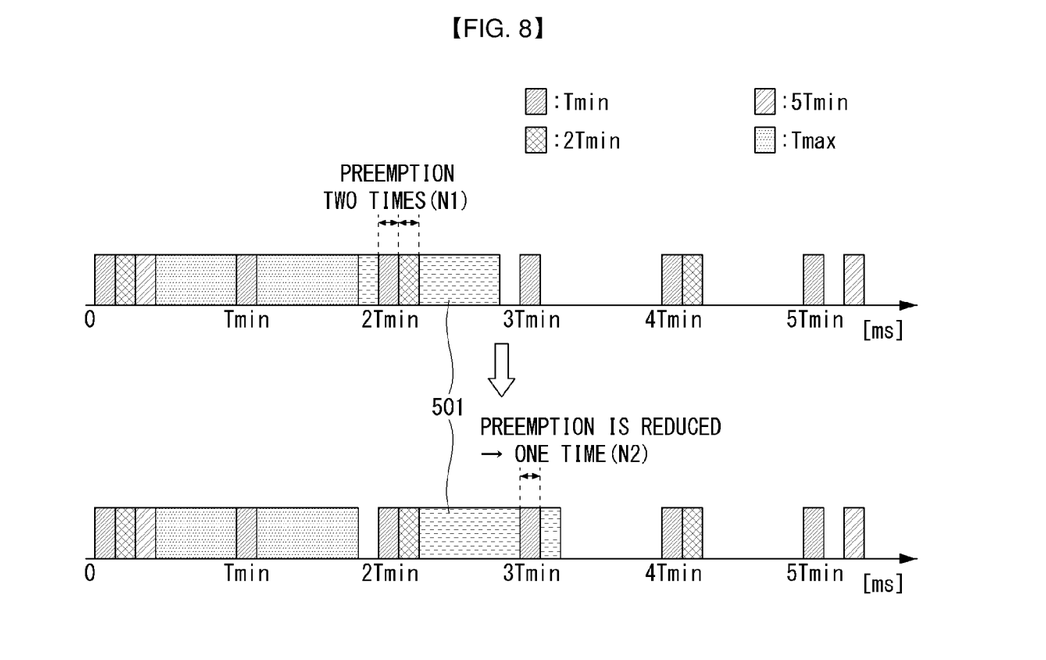

Conversely, as shown in FIG. 8, if there is no case in which non-preemption occurs as a result of virtual arrangement for a specific task 501 but the number of preemptions is reduced compared with N1 (N1=2 in the case of FIG. 8) stored at the time of minimum offset virtual arrangement, the ECU may store the reduced number of preemptions as N2 (N2=1 in the case of FIG. 8) (S106). Alternatively, if there is no change in the number of preemptions N1 as a result of the virtual arrangement, the ECU may perform a next step without additional work.

Figure 9:
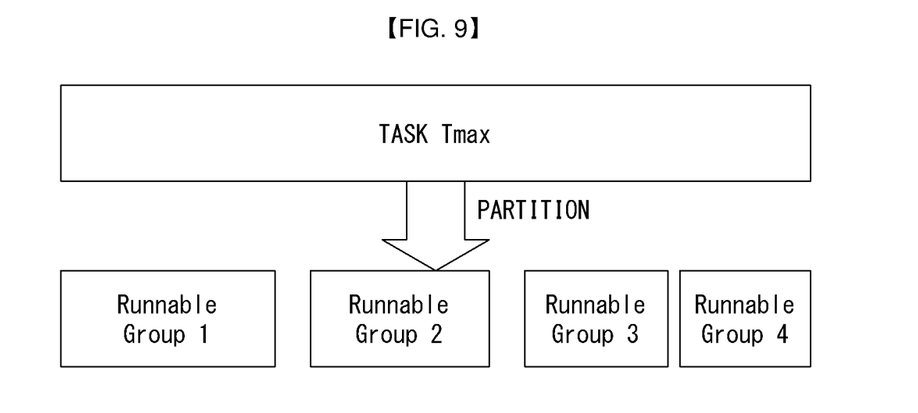

Next, as illustrated in FIG. 9, the ECU may partition a task into runnable groups which are smaller units based on a GGP algorithm (S107). Here, the ECU may partition the task so that there is no correlation between the runnable groups. Thereafter, the ECU may sequentially perform virtual arrangement, starting from a runnable group having a longest execution time among the partitioned runnable groups (S108). Through this, the ECU preferentially selects a section in which preemption between tasks is minimized, and searches an optimal arrangement position (S109). Through this procedure, the ECU may optimally virtually arrange all the runnable groups (S110) and store a total number N3 of preemptions of the runnable groups in case in which the runnable groups are optimally virtually arranged (S111).

Next, the ECU may compare the total number N3 of preemptions derived as a result of the virtual arrangement of the runnable group unit of the task with the numbers N1 and N2 of preemptions derived as the result of the virtual arrangement of the task unit (S112). If the value of N3 is smaller than N1 and N2, it means that it has an effect of reducing the number of preemptions than the existing task unit arrangement method, and thus the ECU may partition the task into runnable group units by applying a task partitioning and allocating method, actually perform arrangement, and then perform a next task arrangement operation. Conversely, if the value of N3 is not different from or greater than N1 or N2, it means that there is no effect of reducing the number of preemptions in the task partitioning and allocating method, and thus the ECU may actually arrange the task according to a task non-partitioning and allocating method and then perform a next arrangement operation.

To sum up, the ECU according to an embodiment of the present disclosure arranges tasks, starting from a task having a shortest period, and if preemption occurs between tasks during the arrangement, the ECU searches all non-allocation/non-arrangement sections in which tasks are not allocated/arranged, while giving an offset change thereto (e.g., in ascending order), to search a section in which preemption between tasks is avoided. In case where preemption cannot be avoided, the ECU may perform virtual arrangement by partitioning the task in the a total number of preemptions decreases due to the virtual arrangement of runnable units, the task partitioning and allocating method may be adopted, and if there is no change or increase in the number of preemption, the task may be arranged by adopting the task non-partitioning and allocating method.

Figure 10:
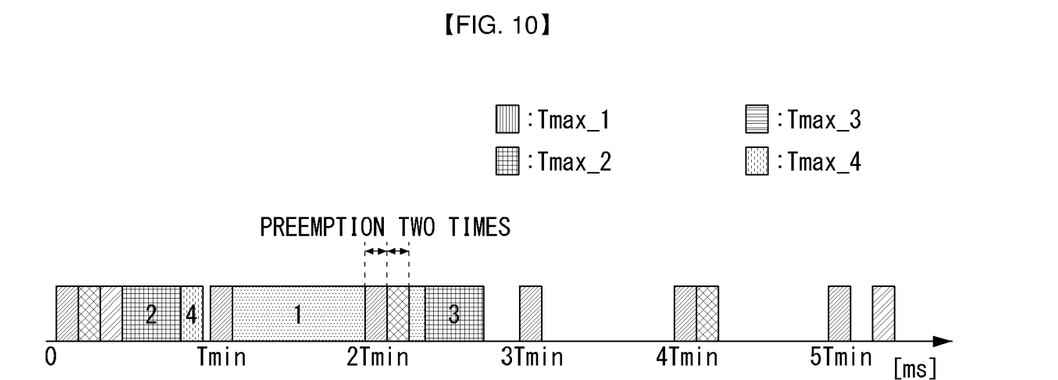

FIG. 10 is a diagram illustrating a result of arranging the Tmax periodic task of FIG. 5 by adopting a task partitioning method according to an embodiment of the present disclosure.

Referring to FIG. 10, the Tmax periodic task may be partitioned into four runnable groups according to the task partitioning method, and the number of preemptions of the Tmax periodic task may be reduced from 3 times (see FIG. 5) to two times (see FIG. 10) through re-arrangement of the runnable group units.

The embodiment according to the present disclosure may be implemented by various means, for example, hardware, firmware, software, or a combination thereof. For implementation by hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In addition, in case of implementation by firmware or software, an embodiment of the present disclosure is implemented in the form of a module, procedure, function, etc. that performs the functions or operations described above and may be recorded in a readable recording medium through various computer means. Here, the recording medium may include program instructions, data files, data structures, or the like, alone or in combination. The program instructions recorded in the recording medium may be specially designed and configured for the present disclosure or may be known and available to those skilled in computer software. For example, the recording medium includes magnetic mediums such as hard disks, floppy disks, and magnetic tapes, optical mediums such as compact disk read only memory (CD-ROM) or digital video disk (DVD), magneto-optical mediums such as floptical disks, and a hardware device specially configured to store and execute program instructions such as ROM, RAM, flash memory, and the like. Examples of program instructions may include high-level language codes that may be executed by a computer using an interpreter, etc., as well as machine language codes made by a compiler. Such hardware devices may be configured to operate as one or more software modules to perform the operation of the present disclosure, and vice versa.

In addition, a device or terminal according to the present disclosure may be driven by instructions that cause one or more processors to perform the functions and processes described above. For example, such instructions may include interpreted instructions such as script instructions such as JavaScript or ECMAScript instructions, executable codes, or other instructions stored in a computer-readable medium. Furthermore, the device according to the present disclosure may be implemented in a distributed manner over a network such as a server farm or may be implemented in a single computer device.

Also, a computer program (also known as a program, software, software application, script, or code) mounted on a device according to the present disclosure and executing the method according to the present disclosure may be created in any form of programming language including a compiled or interpreted language and a priori or procedural language and may be developed in any form including standalone programs or modules, components, subroutines, or other units suitable for use in a computer environment. The computer programs do not necessarily correspond to files in a file system. The program may be stored in a single file provided in a requested program, in multiple interactive files (e.g., files storing one or more modules, subprograms or part of codes), or in part of a file retaining other programs or data (e.g., one or more scripts stored within a markup language document). The computer programs may be arranged to be executed in one computer or in multiple computers that are located at one site or distributed across multiple sites and interconnected by a communication network.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A processor-implemented method for arranging a task in an electronic control unit (ECU) comprising at least one processor and a memory configured to store data, the method comprising:
   sequentially allocating offsets, by the at least one processor, in unit of load measurement, to tasks having a period equal to or greater than a reference value, among the tasks;
   sequentially allocating the offsets, by the at least one processor, to tasks having a period smaller than the reference value, among the tasks, in ascending order, starting from a task having a shortest period; and
   executing the tasks, by the at least one processor, according to the allocated offsets,
   wherein the sequentially allocating of the offset comprises:
   sequentially allocating, by the at least one processor, a smallest offset to a first task having a shortest period among tasks having the period smaller than the reference value, and
   allocating, by the at least one processor, the offset to a second task, which is an allocation target of the offset, among remaining tasks excluding the first task, among the tasks having the period smaller than the reference value, based on a result of comparing the period of the first task and an execution time of the second task.

2. The method of claim 1, wherein the allocating of the offset based on the result of comparing the period of the first task and the execution time of the second task comprises:
   switching the second task to a standby state when the execution time of the second task is longer than the period of the first task; and
   allocating an offset for minimizing preemption with another task to the second task when the execution time of the second task is shorter than the period of the first task.

3. The method of claim 2, wherein the allocating of the offset to the second task to minimize preemption with the other task comprises:
   allocating a largest offset to the second task, among candidate offsets previously allocated to a third task having a period shorter than a period of the second task and having a minimum preemption number with the other task.

4. The method of claim 3, wherein:
   the third task is a task completed in offset allocation in order immediately before the second task, and
   the second task is arranged immediately after the third task arranged in the offset allocated to the second task.

5. The method of claim 2, further comprising:
   virtually allocating all offsets to the tasks in a standby state and allocating an offset having a minimum preemption number with the other task as a result of the virtual allocation.

6. The method of claim 2, wherein the sequentially allocating of offsets, in unit of load measurement, to tasks having a period equal to or greater than a reference value, among the tasks comprises:
   sequentially allocating the offsets in ascending order, starting from a task having a short period among the tasks having the period equal to or greater than the reference value, and
   arranging the task such that the allocated offset is located in the middle of performing the task to which the offset is allocated.

7. The method of claim 2, wherein the reference value and the unit of load measurement are 10 ms.

8. The method of claim 1, wherein the reference value is determined based on the unit of load measurement.

9. An electronic control unit (ECU) for arranging a task, the ECU comprising:
   at least one processor; and
   a memory configured to store data,
   wherein the at least one processor configured to execute instructions stored in the memory, thereby configuring the at least one processor to:
   sequentially allocate offsets, in unit of load measurement, to tasks having a period equal to or greater than a reference value, among the tasks,
   sequentially allocate the offsets to tasks having a period smaller than the reference value, among the tasks, in ascending order, starting from a task having a shortest period, and
   executing the tasks, according to the allocated offsets, and
   wherein the processor is further configured to:
   sequentially allocate a smallest offset to a first task having a shortest period among tasks having the period smaller than the reference value, and
   allocate the offset to a second task, which is an allocation target of the offset, among remaining tasks excluding the first task, among the tasks having the period smaller than the reference value, based on a result of comparing the period of the first task and an execution time of the second task.

10. The ECU of claim 9, wherein when allocating the offsets based on the result of comparing the period of the first task and the execution time of the second task, the at least one processor is configured to:
    switch the second task to a standby state when the execution time of the second task is longer than the period of the first task, and
    allocate an offset for minimizing preemption with another task to the second task when the execution time of the second task is shorter than the period of the first task.

11. The ECU of claim 10, wherein, when allocating the offset to the second task to minimize preemption with the other task, the at least one processor is configured to:
    Allocate a largest offset to the second task, among candidate offsets previously allocated to a third task having a period shorter than a period of the second task and having a minimum preemption number with the other task.

12. The ECU of claim 11, wherein:
    the third task is a task completed in offset allocation in order immediately before the second task, and
    the second task is arranged immediately after the third task arranged in the offset allocated to the second task.

13. The ECU of claim 10, wherein the at least one processor is configured to:
    virtually allocate all offsets to the tasks in a standby state, and alecates allocate an offset having a minimum preemption number with the other task as a result of the virtual allocation.

14. The ECU of claim 10, wherein, when sequentially allocating offsets, in unit of load measurement, to tasks having a period equal to or greater than a reference value, among the tasks, the at least one processor is configured to:
    sequentially allocate the offsets in ascending order, starting from a task having a short period among the tasks having the period equal to or greater than the reference value, and arrange the task such that the allocated offset is located in the middle of performing the task to which the offset is allocated.

15. The ECU of claim 9, wherein the reference value is determined based on the unit of load measurement.

16. The ECU of claim 9, wherein the reference value and the unit of load measurement are 10 ms.

* * * * *